(12) United States Patent  
Alpha et al.

(10) Patent No.: US 7,299,221 B2  
(45) Date of Patent: Nov. 20, 2007

(54) PROGRESSIVE RELAXATION OF SEARCH CRITERIA

(75) Inventors: Shamim Alpha, Pabna (BD); Paul Dixon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 595 days.

(21) Appl. No.: 10/434,845

(22) Filed: May 8, 2003

(65) Prior Publication Data

US 2004/0225643 A1 Nov. 11, 2004

(51) Int. Cl.  
*G06F 17/30* (2006.01)

(52) U.S. Cl. .................. 707/3; 707/4; 707/10
(58) Field of Classification Search .......... 707/2, 707/3, 5, 10, 4, 104.1  
See application file for complete search history.

(56) References Cited

U.S. PATENT DOCUMENTS

| | | | |
|---|---|---|---|
| 5,600,829 A * | 2/1997 | Tsatalos et al. ............ | 707/2 |
| 5,873,080 A * | 2/1999 | Coden et al. .............. | 707/3 |
| 6,032,145 A * | 2/2000 | Beall et al. ............... | 707/5 |
| 6,263,328 B1 * | 7/2001 | Coden et al. .............. | 707/3 |
| 6,324,534 B1 * | 11/2001 | Neal et al. ............... | 707/3 |
| 6,345,271 B1 * | 2/2002 | Dempsey et al. .......... | 707/4 |
| 6,691,109 B2 * | 2/2004 | Bjornson et al. .......... | 707/4 |
| 6,871,204 B2 * | 3/2005 | Krishnaprasad et al. .... | 707/102 |
| 2002/0099687 A1 * | 7/2002 | Krishnaprasad et al. .... | 707/1 |
| 2005/0055336 A1 * | 3/2005 | Hui et al. ................ | 707/3 |

OTHER PUBLICATIONS

Oracle Corporation, "Oracle9i Database, Daily Feature, Query Template," Jun. 13, 2002, 3 pages.

Garrett Kaminaga, Oracle Corporation, "Oracle8i interMeda Text 8.1.5—Technical Overview," Oct. 7, 2001, http://otn.oracle.com/products/text/x/Tech_Overviews/imt_815.html, printed Sep. 12, 2003, pp. 1-59.

Garrett Kaminaga, Oracle Corporation, "Oracle Text 9.0.1 Technical Overview," Oct. 7, 2001, http://otn.oracle.com/products/text/x/Tech_Overviews/text_901.html, printed Sep. 12, 2003, pp. 1-55.

Oracle Corporation, "Oracle Ultra Search Online Documentation, Release 9.0.2 Production, Customizing the Query Syntax Expansion," Nov. 20, 2002, http://otn.oracle.com/products/ultrasearch/htdocs/qsyntax.htm, printed Sep. 12, 2003, pp. 1-7.

(Continued)

*Primary Examiner*—Shahid Al Alam  
(74) *Attorney, Agent, or Firm*—Hickman Palermo Truong & Becker LLP

(57) ABSTRACT

An efficient information search mechanism provides control over the relaxation of a search query to users that are requesting searches. Through such a mechanism, a user can specify a sequence of sub-queries that is associated with variations of the main search criteria, and specify a progression in which to execute the sub-queries. Hence, users can impart their priorities with respect to search term variations used in relaxing the main search criteria, which further allows the users to impart their notion of the relevance of results that may be returned by particular sub-queries. A query that includes a sequence of sub-queries is received and the sub-queries are executed, if at all, by a database server in an order based on the progression specified by the user. Response time and network loading are improved through reduction of unnecessary work by the database server and through reduction of computationally costly communications between client and server and associated processing.

40 Claims, 4 Drawing Sheets

OTHER PUBLICATIONS

Oracle Corporation, "Oracle Text 9.2.0 Technical Overview," Jun. 3, 2002, http://otn.oracle.com/products/text/x/ot920.html, printed Sep. 12, 2003, pp. 1-21.

Gaasterland T., "Restricting Query Relaxation Through User Constraints", Intelligent and Cooperative Information Systems, Proceedings of International Conference, May 12, 1993, pp. 359-366.

Gaasterland T., "Cooperative Answering through Controlled Query Relaxation", IEEE Expert, IEEE Inc., New York, US, vol. 12, No. 5, Sep. 1, 1997, pp. 48-59.

Li W-S, et al., "Facilitation Complex Web Queries through Visual User Interfaces and Query Relaxation", Computer Networks and ISDN Systems, North Holland Publishing, Amsterdam, NL, vol. 30, No. 1-7, Apr. 1998, pp. 149-159.

PCT International Search Report & Written Opinion from PCT for foreign patent application No. PCT/US2004/10020, dated Nov. 30, 2004 (6 pgs).

Current Claims in PCT patent application No. PCT/US2004/10020 (3 pgs).

Written Opinion of the International Preliminary Examining Authority received in corresponding PCT International application No. PCT/US2004/010020.

Notification of Transmittal of the International Preliminary Report on Patentability for corresponding International application No. PCT/US2004/010020 including latest amended claims.

* cited by examiner

PROGRESSIVE RELAXATION OF SEARCH CRITERIA

FIELD OF THE INVENTION

The present invention relates generally to information retrieval and, more specifically, to techniques for specifying progressive relaxation of search criteria.

BACKGROUND OF THE INVENTION

Applications for servicing client, or end user, queries often operate such that not only are exact matches for a user-specified query identified if they exist, but the closest non-exact matches are also identified and returned to the end user. In this context, the term "query" is not limited to a conventional database query, such as a query in SQL (Structured Query Language). Generally, a query includes any search for information through any search mechanism, such as a conventional search engine or search function. Typically, the user's search request is eventually transformed into a structured database query.

One approach to servicing search requests or queries, in order to identify existing exact matches and non-exact matches, involves: (1) rewriting or reconstructing the user query to include all allowable variations of the original query; (2) retrieving a "hit-list" for the reconstructed concatenated query by submitting the query to a database server; and (3) ordering the hit-list in an order based on the relevance to the original search criteria (sometimes referred to as "relevance ranking").

For example, if a user initiates a search for information on "cheap pen" on some form of information repository, such as a database or the collection of information that is accessible via the Internet, an "expanded query" is constructed to include both the original query and to include one or more sub-queries that relax the requirements of the original query. An expanded query associated with a search for "cheap pen" might include sub-queries for other allowable versions of "cheap pen," such as "cheap NEAR pen," "cheap AND pen," "$cheap AND $pen" (where "$" represents a grammatical stem operation), "cheap OR pen" and the like. A hit-list is produced based on this set of sub-queries, and the hit-list is then ordered. The ordering may be based on, for example, the specific sub-query that produced a given hit and a speculative relevance to the end user that is requesting the information.

In such an approach, useless work may be performed because all of the sub-queries are executed, whether or not necessary to actually fulfill the user's request and interest. That is, the first sub-query executed may produce a sufficient number of hits or sufficiently relevant results to satisfy the user's interest. Furthermore, if a given sub-query is particularly unselective, it may produce many more hits than are necessary to satisfy the user's interest and unnecessary work is performed by parsing the query statement, querying the information repository, and producing and ordering the results.

Another approach involves: (1) executing sub-queries associated with allowable variations of the original query, in series in descending order of priority; and (2) retrieving hits until enough hits have been located, based on some criteria. This approach involves an entity other than the database server, such as an end user or a search mechanism, issuing a query to the database server based on the original search criteria, receiving results from the query, issuing another query to the database server that expands the original search criteria, receiving results, and continuing this iterative process until the search request has been satisfied according to some quantitative criteria. Query response time and network performance suffer when using this approach due to the potential for multiple complete round-trip communications between the entity and the database server, which unnecessarily load the system. In this context, and throughout the specification, a complete round-trip communication refers to the network communication between a client entity and a database server, as well as the processing performed by the database server, which often includes: (1) parsing the query; (2) constructing a query execution plan; (3) optimizing the query execution; and the like. Secondary client-server communications refer to communications between client and server applications which do not incur the same processing overhead as complete round-trip communications.

Both of the foregoing approaches are inefficient in terms of response time, processing, and network loading. Furthermore, these approaches are cumbersome for developers of search applications and mechanisms because they require such applications and mechanisms to speculatively relax the search requirements and process results with respect to relevance ranking. Furthermore, they provide limited capabilities, if any, for end users to affect the priority of search term variations in the context of relaxation of the original search criteria and, consequently, the relevance of associated results.

Based on the foregoing, it is clearly desirable to provide an improved mechanism for servicing information searches. There is a more specific need to provide more control to an end user that is requesting a search for particular information to provide more efficient and more relevant performance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
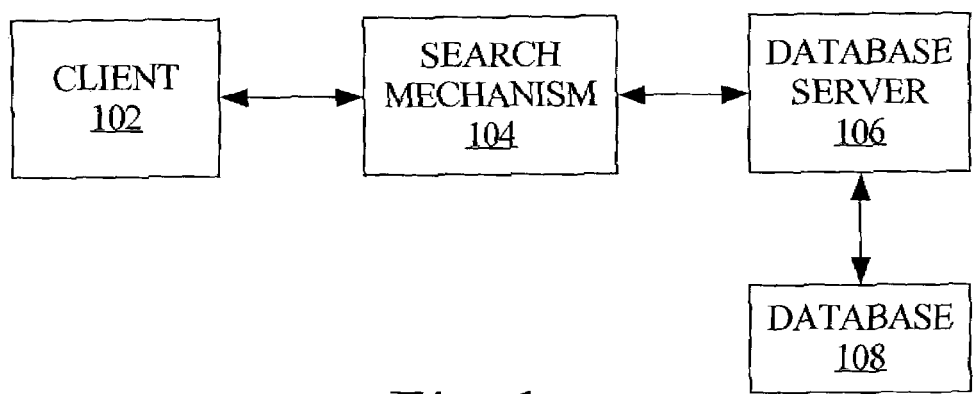
FIG. 1 is a block diagram that illustrates a simplified example of an operating environment in which an embodiment may be implemented.

A method and mechanism are described for specifying progressive relaxation of search criteria. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In order to provide a more efficient search mechanism, control over the relaxation of a search query is provided to users that are requesting searches. Progressive relaxation of queries allows for complex queries without compromising performance. Generally, complex queries are processed to provide increased recall, or completeness, of results without compromising the precision, or quality, of the results. Through such a mechanism, a user can specify a sequence of sub-queries that is associated with variations of the main search term, and specify a progression in which to execute the sub-queries. Hence, users can impart their priorities with respect to search term variations used in relaxing the main search criteria, which further allows the users to impart their notion of the relevance of results that may be returned by particular sub-queries. Unlike prior approaches, the sub-queries are not all immediately and fully executed by the database server when they are received. Rather, each sub-query is only executed when the previously executed sub-query has not produced results that satisfy the user.

In an embodiment, the sub-queries select data from a database based on search criteria associated with the information being requested, which may include variations of original search terms, and the progression according to which the sub-queries are executed corresponds to a progressive relaxation of the original search terms.

According to one aspect, a series of sub-queries specified by a user are received at a server, for example, and executed in an order based on the progression specified by the user. Hence, multiple sub-queries may be executed by the server in response to only a single complete round-trip communication between the user/client and the server, and the server need only process a single query. Network loading and response time and are thereby improved.

In an embodiment, a series of sub-queries specified by a user are received at the database server in a single round-trip communication. The server then executes the sub-queries in an order based on the progression specified by the user, however, each sub-query is executed only if the results of the previously executed sub-queries were not sufficient to fulfill the search request. For example, if the user requests a specific number of result hits, the sub-queries are executed in series until the number of requested hits have been produced, but no more sub-queries than are necessary are executed. Thus, for example, if execution of the first sub-query provides enough hits or sufficiently relevant hits to satisfy the user request, then none of the other sub-queries are executed and, consequently, computational resources are conserved. In such an embodiment, the user may specify "stop criteria" (e.g., a minimum number of hits, an amount of time, a volume of data, or a combination of such criteria) through interaction with a user interface prior to submission of a search. Once the search results satisfy the stop criteria, the database server does not execute any further sub-queries. Hence, this user-specified stop criteria approach would only require one complete round-trip communication between the client and server, and the server need only process a single query.

Alternatively, the user may iteratively request more hits through interaction with a user interface, as needed to satisfy the user's interest. In this case, the user interaction is not sending a new query, but indicating that the server is to proceed to the next sub-query in the original received query. Similarly to the user-specified stop criteria approach, only one complete round-trip communication and associated processing is required. This scenario may require multiple secondary communications between the client and server because the server does not have knowledge of the stop criteria prior to formulation of a query execution plan. However, these secondary client-server communications are not computationally expensive, complete round-trip communications that require significant query processing overhead.

Non-limiting examples of some benefits provided by the techniques described herein are (1) a reduction in network load due to a reduction in computationally expensive complete round-trip communications between a client and a server; (2) a reduction in unnecessary load on a database server due to executing queries that are not actually required to meet an end-user's needs; (3) an elimination or reduction in work from a search engine or middleware application with respect to relevance ranking processing; and (4) ease of use, by shifting work to a database server from an end user, and/or ease of application development, by shifting work to a database server from a search engine or middleware application, both with respect to construction of queries based on original search terms.

OPERATING ENVIRONMENT EXAMPLE

FIG. 1 is a block diagram that illustrates a simplified example of an operating environment in which an embodiment of the invention may be implemented.

Embodiments comprise techniques for managing information searches, which includes managing database queries. Hence, an example of an operating environment includes a client 102, a search mechanism 104, a database server 106 and a database 108.

Client 102 is a client computer software application that executes on a computing platform, such as a desktop or laptop computer, to communicate with a server computer software application, such as search mechanism 104 or database server 106. Client 102 facilitates a process in which an end user, such as a person requesting a search for information, communicates with search mechanism 104 in order to request data or information. For example, client 102 may be a conventional web browser that facilitates communication over a network, such as the Internet. Thus, client 102 may display on a display terminal various web pages, data input frames, query results, and the like. Client 102 displays information or pages served from search mechanism 104.

Search mechanism 104 is typically a combination of a computer software application and the computer hardware on which the application executes, such as a server computer. Search mechanism 104 provides a user interface and searching functionality to an end user using client 102. For non-limiting examples, search mechanism 104 may be what is commonly referred to as a search engine, for searching the Internet for information contained in web pages, or may be an interface to a more specialized information source, such as a search function on an e-commerce or corporate web page, or may be an application server.

Search mechanism 104 serves as an interface between client 102 and a database server 106, and can be considered a client of database server 106. Search mechanism 104 and database server 106 can be configured together on a single computing platform and can be configured as related software modules that provide integrated functionality to client 102. Thus, search mechanism 104 and database server 106 are not required to be separate entities as depicted in FIG. 1.

Database server 106 provides the data requested by an application server, such as search mechanism 104, on behalf of a client 102. The database server does all of the remaining query processing not performed by the search mechanism 104 or by a user of client 102. Thus, database server 106 is a highly functional interface to a data repository, such as database 108, for managing a large amount of data in a multi-user environment. In broad terms, database server 106 accesses data in database 108 pursuant to a request.

Database 108 is a collection of data treated as a unit. Generally, the purpose of a database 108 is to store and retrieve related information. Database 108 comprises some type of data storage unit or data container, such as a data table with associated rows and columns or an object class with associated objects. Database 108 typically comprises multiple other structures for storing, accessing and manipulating data, for example, indexes on tables. Embodiments do not require any specific logical or physical structure for database 108.

Text Queries

According to one embodiment, a CONTAINS operator is used to implement a progressive relaxation mechanism as described herein. A CONTAINS operator is used in the WHERE clause of a SELECT statement to specify a query expression for a text query. The CONTAINS operator returns a relevance score for every row selected, which is obtainable with a SCORE operator. One grammar for the CONTAINS operator is called CONTEXT. Another applicable grammar is CTXCAT. An example of a query that includes a CONTAINS operator is as follows:

```
CONTAINS (
   [schema.]column
   text_query      VARCHAR2
   [,label         NUMBER])
RETURN NUMBER;
``` where [schema.]column specifies the text column to be searched, which preferably has a text index associated therewith. The text_query parameter specifies (1) the query expression that defines the search in the column, or (2) a marked-up string that specifies a query based on the CTXCAT grammar. In specifying a query based on the CTXCAT grammar, via a query template, the query string uses the following tags:

```
<query> </query>, which signals that this query is to be interpreted
   as a query template;
<textquery> </textquery>, which specifies the query string;
grammar= , which specifies the grammar of the query;
<score> </score>, which specifies the score preference; and
datatype= , which specifies the type of number returned as score.
```

For each row selected, CONTAINS returns a number between 0 and 100 that indicates how relevant the document row is to the query, with 0 indicating that no matches are found in a given row.

The CONTEXT grammar is the default grammar for the CONTAINS operator and allows use of query operators in a query expression. For example, the logical operator AND allows for searching for all documents that contain two different words; the ABOUT operator allows for searching on concepts; the WITHIN operator allows for section searching, such as in sections of XML or HTML documents; and the NEAR operator allows for proximity searches, stem searches, fuzzy, and thesaural operators for expanding a query expression, or stated differently, for relaxing the search criteria associated with a query. In addition, an index on a table that stores text is typically of indextype "context", if the CONTEXT grammar is expected to be utilized for text searches.

Functional Components

Figure 2:
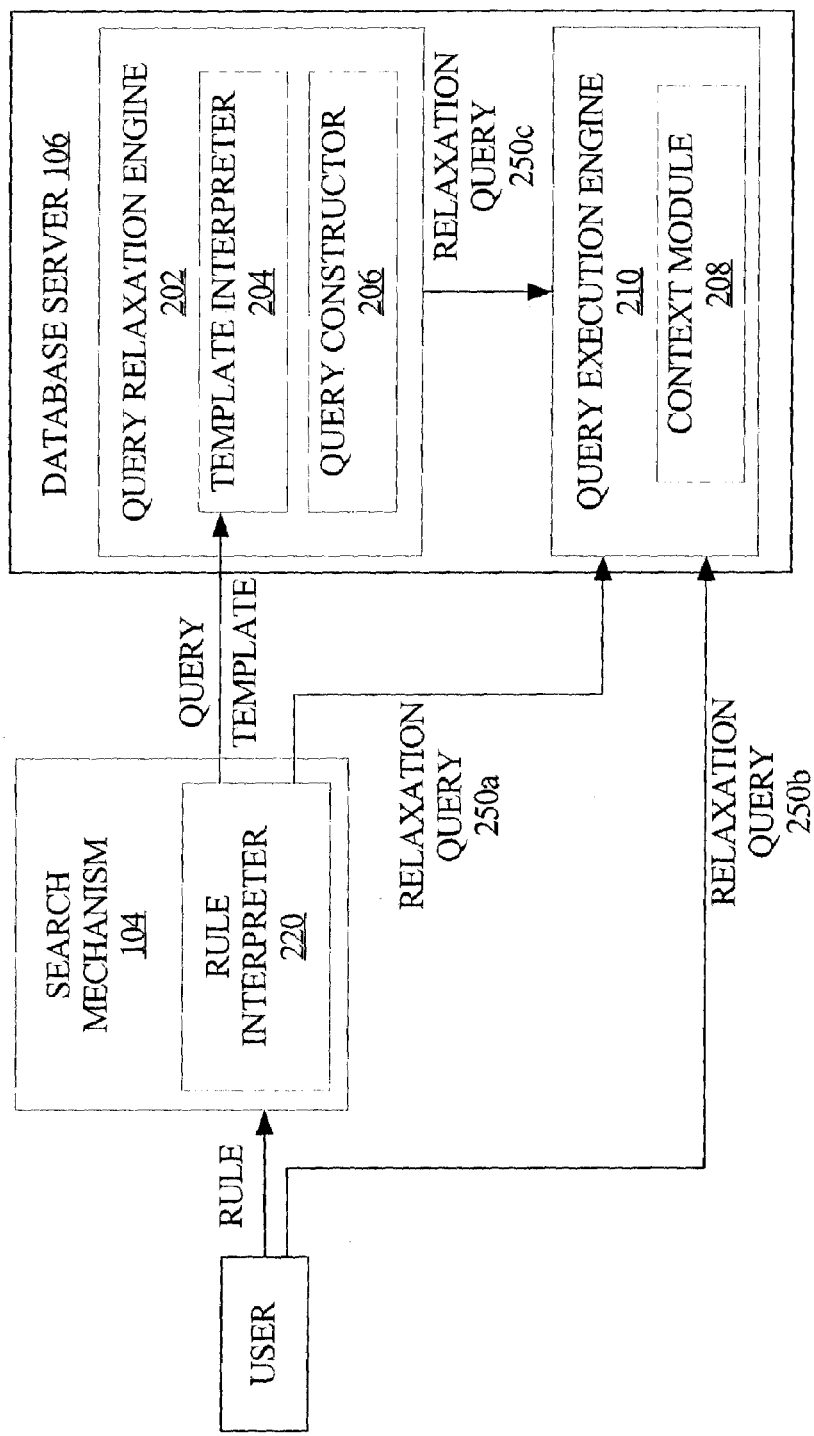
FIG. 2 is a block diagram that illustrates relevant functional components of a database server and a search mechanism.

FIG. 2 is a block diagram that illustrates relevant functional components of database server 106 and search mechanism 104.

Search mechanism 104 comprises a rule interpreter 220. Rule interpreter 220 operates to interpret and translate rules associated with an information search. For example, in one embodiment, which is described in more detail below, a user of client 102 (FIG. 1) specifies a search term or value, referred to as search criteria, in the form of rules which are interpreted by rule interpreter 220 and translated into another format. For example, a user might provide a set of search rules such as (search terms, AND, OR), which specifies search criteria (i.e., original search terms in original form, conjunctive form of search terms; disjunctive form of search terms) and an order in which to execute related sub-queries (i.e., execute original form first, conjunctive form next, disjunctive form next).

Upon receiving a set of rules, rule interpreter 220 constructs a query template based on the set of rules. According to one embodiment, the query template is in the form of a <text_query> template, as described above. According to another embodiment, the query template is in the form of a "rewrite template," which is described below. In both embodiments, the query template represents search criteria and an order in which sub-queries associated with the search criteria are to be executed.

In another embodiment, rule interpreter 220 generates a relaxation query 250a based on the rules received, for submission to database server 106. The relaxation query 250a includes search criteria and an order in which constituent sub-queries associated with the search criteria are to be executed.

Rule interpreter 220, or other modules within search mechanism 104, may be configured to provide other functionality to make users' interaction with database server 106 user-friendly.

Database server 106 functionally comprises a query relaxation engine 202 and a query execution engine 210. Query relaxation engine 202 comprises a template interpreter 204 and a query constructor 206, and query execution engine 210 comprises a context module 208.

Template interpreter 204 is configured to interpret various forms of search criteria, such as query templates, that specify or otherwise represent a sequence of sub-queries and an order in which to execute the sub-queries. Template interpreter 204 passes information to query constructor 206, which processes the received information into a query. The query is executed to fetch information from database 108 (FIG. 1), possibly in conjunction with context object 208.

Template interpreter 204 is configured to interpret query templates, such as what may be output from rule interpreter 220 or some other source. For example, rule interpreter 220 receives a set of rules from an end user and generates a query template based on those rules, which serves as a request to construct a query based on the query template. In turn, template interpreter 204 receives and interprets the query template and passes information to query constructor 206 that is necessary to construct a query according to a query language that database server 106 supports, such as SQL or PL/SQL. In one embodiment, a rewrite template is received from rule interpreter 220 and includes statements that effectively request that a query be constructed based on the set of rules. An example of a rewrite template, with respect to a search for "cheap pen", is as follows:

```
<query>
    <textquery>
        'cheap pen'
        <PROGRESSION>
            <seq><REWRITE> TRANSFORM(TOKENS, ' ',' ',' ')
            </REWRITE></seq>
            <seq><REWRITE> TRANSFORM(TOKENS, ' ',' ','&')
            </REWRITE></seq>
            <seq><REWRITE> TRANSFORM(TOKENS, ' ','$','&')
            </REWRITE></seq>
        </PROGRESSION>
    </textquery>
</query>;
``` where the arguments of the TRANSFORM function include a prefix associated with the search terms, a suffix associated with the search terms, and an operator related to the search terms. Thus, a prefix or suffix can be specified in association with the search terms, in addition to a relevant operator associated with the search terms, such as "&" which represents logical operator "AND " or "/" which represents logical operator "OR". The prefix and suffix fields provide support for variations such as stem and wildcard searches. Hence, use of this embodiment in conjunction with rule interpreter 220 provides a user-friendly capability for end users to simply provide a set of rules as input for a search, whereby through a series of processes an associated query is constructed for execution by database server 106 to fetch information from database 108 (FIG. 1).

Based on the foregoing rewrite template, template interpreter 204 parses the search phrase "cheap pen" into multiple words, "cheap" and "pen", and each word is transformed according to the specified rules and passed to query constructor 206 for generation of a query on database 108 (FIG. 1). For example, processing of the function TRANSFORM(TOKENS, " ",'$','&'), with respect to the search terms "cheap pen", functions to construct a sub-query based on suffix stems of "cheap" and "pen", in the conjunctive form. Thus, a sub-query is constructed based on the REWRITE operator and the TRANSFORM function, which searches for (1) "cheaper" AND "pen"; and (2) "cheapest" AND "pen".

The preceding delineation of functionality between template interpreter 204 and query constructor 206 is not limiting, for these functions may be performed by an integrated interpreter 204/constructor 206 software module.

Query constructor 206 receives various forms of information that define a search, such as text strings, text query templates, rewrite templates, and non-text parameters. Query constructor 206 then constructs queries from the information received, such as relaxation query 250c. Such queries are, in turn, submitted to query execution engine 210 for execution against database 108 (FIG. 1).

Query execution engine 210 interfaces with and executes queries, such as relaxation queries 250a, 250b, 250c, against database 108 (FIG. 1). Query execution engine 210 comprises a context module 208 that implements the functionality of the CONTEXT grammar when searching for text. Hence, if a CONTAINS operator is identified in the process of executing a SQL query, the CONTAINS argument text string or template is passed to the context module 208, possibly via template interpreter 204, for processing according to the functionality of the CONTEXT grammar. In addition, query execution engine 210 supports execution of a relaxation query 250b, received directly from an end user.

User-Specified Progressive Relaxation of Query Requirements

According to an aspect of the invention, native support for progressive relaxation of database queries is provided in a database server application. Hence, applications and end-users are able to specify a sequence of sub-queries that is associated with a data search, and an order in which to execute the sub-queries to produce a desired result. Therefore, users can affect the manner and extent of the search performed to enhance the performance of the search. In addition, users can affect the quality of the relevance ranking of related results or hit-lists, without significant degradation in query response time or throughput. Such a technique improves query response time and throughput by reducing unnecessary query/search term expansions and computationally expensive complete round-trip communications between client and server applications.

In an embodiment, capabilities are provided for a user to specify a progression sequence of sub-queries to be executed with respect to different sections of a document, such as HTML and XML documents. For example, a user may specify that a term be searched for first in the title of one or more documents and next in the body of the one or more documents and next in the description of graphic objects that appear in the one or more documents. Hence, refined search capabilities are provided.

In an embodiment, a query that includes a CONTAINS clause can be issued against a database, wherein the search string is not required to adhere to conventional text query grammar. Instead, a search string may adhere to text query template format, as the following example illustrates, in which a query template is used as the query expression argument for a CONTAINS operator. The following provides an example query for searching text stored in a data table that is indexed with a context index type:

```
SELECT * from tablename
    WHERE CONTAINS (columnname, 'search criteria', 1) > 0.
```

Thus, according to this embodiment, a query template is provided as the argument to the CONTAINS clause, depicted in the preceding query as the "search criteria." In such an embodiment, the following example mark-up document, or query template, can be used as an argument to a CONTAINS clause. That is, the query template is used to represent the search criteria. The query template specifies a sequence of sub-queries, i.e., probes into one or more tables, and a progressive order in which to execute the sub-queries against a specified column of a table.

```
<query>
    <textquery>
        <PROGRESSION>
            <seq> cheap pen </seq>
```

```
            <seq> cheap & pen </seq>
            <seq> cheap / pen </seq>
          </PROGRESSION>
        </textquery>
      </query>
```

The preceding query and template illustrate a search on text, however, any data value or data type stored in one or more databases may be searched by applying the techniques described herein. Furthermore, the databases may be distributed and associated with multiple distributed servers, such as in the context of searching the Internet.

In an alternative embodiment, the progression is implemented with SQL or PL/SQL extension operators instead of a mark-up template. For example, a PROGRESSION operator is defined as an extension to existing set of SQL operators, thus providing native database support for specification of progressions according to the techniques described herein.

During execution of a query that includes a clause such as a CONTAINS clause for text or a similar clause for non-textual data, upon identification of a <query> tag, the execution engine will not process the relevant portion of the query as a typical query. Rather, a database server, such as database server 106 (FIG. 1), extracts the information between the <textquery> tags, determines whether a progression is specified, such as via a <PROGRESSION> tag, and executes related sub-queries in an order specified by the progression.

In the example above, a sub-query would first be executed to search for documents that contain the phrase "cheap pen". Next, a sub-query could be executed to search for documents that contain both words "cheap" and "pen". Finally, a sub-query could be executed to search for documents that contain either of the words "cheap" or "pen".

In one embodiment, each of the three sub-queries may be automatically run in series according to the specified progression, with the results ordered according to which sub-query produced the given results. For example, hits returned from the first sub-query are produced or displayed with higher relevance ranking than hits returned from the second and third sub-queries.

The manner in which the relevance rankings are presented is not limited. For example, the relevance ranking of the results may be identified simply by the order of presentation to the search requestor or may be assigned numerical rankings, percentages, etc. Such a scenario eliminates multiple round-trip communications between the client and the server and consequent network overhead.

In an alternative embodiment, each of the sub-queries may only be executed, if at all, when the previously execute sub-queries did not fulfill the information search request. For example, if tens or hundreds of documents that include the phrase "cheap pen" are located by executing only the first sub-query, then execution of the remaining sub-queries is suspended or foregone completely. Thus, such a scenario eliminates multiple complete round-trip communications between the client and the server and consequent query processing and network overhead, as well as unnecessary probing. However, if the user specifically requests additional results, then the second and/or third queries can then be executed as necessary to fulfill the specific requirements of the search request. In such a scenario, subsequent client-server communications are not what is referred to above as complete round-trip communications, but are considered secondary communications because they require little or no "overhead" processing of the query, such as parsing, optimization, and the like.

Process for Managing an Information Search-Client

Figure 3:
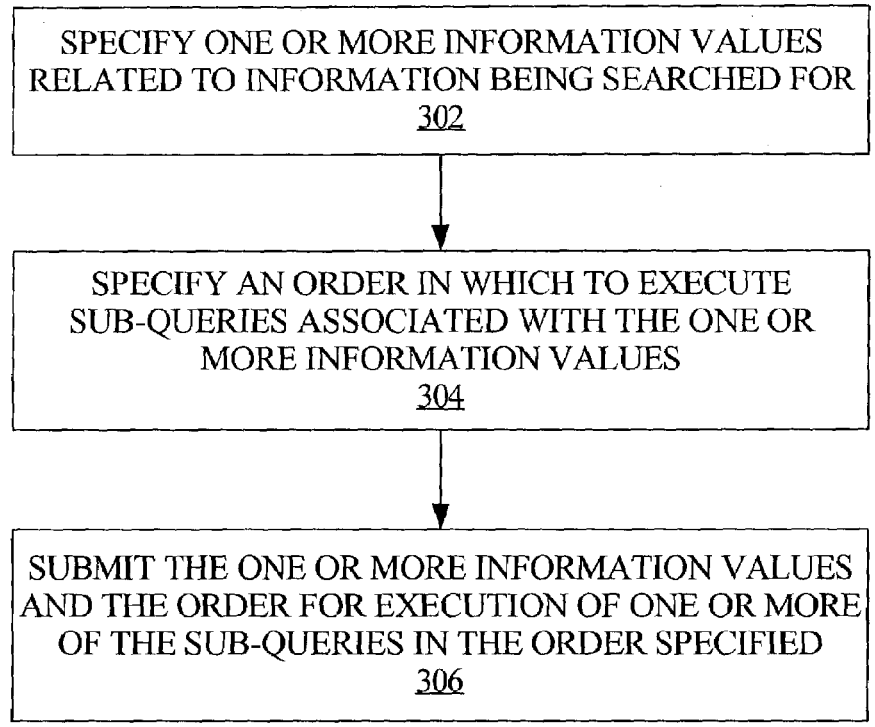
FIG. 3 is a flow diagram that illustrates a process for managing an information search.

FIG. 3 is a flow diagram that illustrates a process for managing an information search. According to one aspect of the invention, this process is performed by an end user who is requesting an information search, typically via a user interface.

At block 302, one or more information values are specified relating to information being searched for. At block 304, an order in which to execute sub-queries associated with the one or more values is specified. For example, a user may submit a query template, as described above, or a set of rules from which a query is constructed, as described above. Blocks 302 and 304 are preferably performed concurrently, however the steps may be performed in sequence. In one embodiment, the values and order are specified via a user interface, and in one embodiment, in the form of an XML document.

At block 306, the one or more information values and the order are submitted for execution of one or more of the sub-queries in the order specified. This information may be submitted directly to a database server, such as database server 106 (FIG. 1), or indirectly through a middleware application such as a search engine or function.

In one embodiment, an information value that is associated with one or more particular sections of a document is specified at block 302. In a related embodiment, an information value is specified at block 302 that is associated with at least two particular sections of a document, and the order specified at block 304 includes an order in which to execute sub-queries associated with the information value with respect to the at least two particular sections of the document, as previously described.

Process for Managing an Information Search-Server

Figure 4:
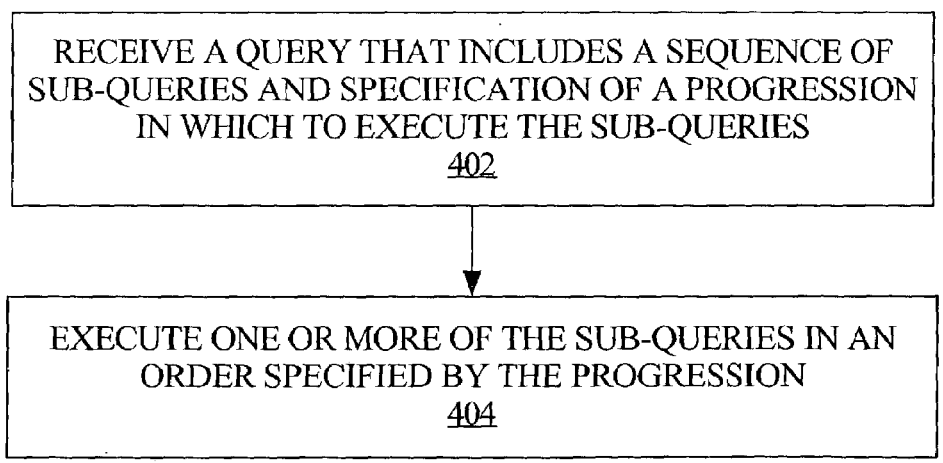
FIG. 4 is a flow diagram that illustrates a process for managing an information search.

FIG. 4 is a flow diagram that illustrates a process for managing an information search. According to one aspect of the invention, this process is performed by a database server.

At block 402, a query is received that includes a sequence of sub-queries and specification of a progression in which to execute the sub-queries. For example, a query that includes a CONTAINS clause for querying text is received, which includes a query template as an argument of the clause, as described above. In one embodiment, the query is received in the form of an XML document. The query that is received may, for example, include sub-queries that are associated with a particular section of a document.

At block 404, one or more of the sub-queries are executed in an order specified by the progression. In one embodiment, the process includes receiving a request for a particular number of results from the search, for example, along with the query received at block 402 or iteratively from an end user or otherwise. For an example of the iterative process, an end user may request, with successive communications, query results ten at a time. Thus, a database server or search mechanism successively provides the results in response to those requests, i.e., ten at a time. Furthermore, each sub-query of the one or more sub-queries is executed only if previously executed sub-queries have not produced results sufficient to fulfill the request for the specified number of results. For example, if the first executed sub-query produces thirty results and the user is iteratively requesting hits ten at a time, then the second sub-query is not executed until the user requests the thirty-first through fortieth hits.

In contrast to prior approaches using concatenated queries, all of the sub-queries are not necessarily executed. Further, in contrast with prior approaches in which each sub-query is submitted to the database server in series, the present embodiment can submit multiple sub-queries to the database server using only one complete round-trip communication between an end user that is requesting the search, such as at client 102 (FIG. 1) and a server that is searching for the information, such as database server 106 (FIG. 1). Control over which sub-queries are actually executed, and in what order, is provided by the end user rather than assumed by a software application and/or search engine or function, and is applied by the database server.

In one embodiment, all of the sub-queries select data from a database based on a respective particular set of values, i.e., search criteria, and the progression corresponds to a relaxation of the search criteria. For example, a sub-query is constructed for each of the original search term and variations of the search term "cheap pen", using a particular set of values such as (1) "cheap" and "pen", (2) a stem of "cheap" and "pen", and (3) "cheap" or pen". Therefore, the search criteria "cheap pen" is progressively relaxed by executing the associated sub-queries, which expand the search, according to the specified progression.

Implementation Mechanism-Hardware Overview

Figure 5:
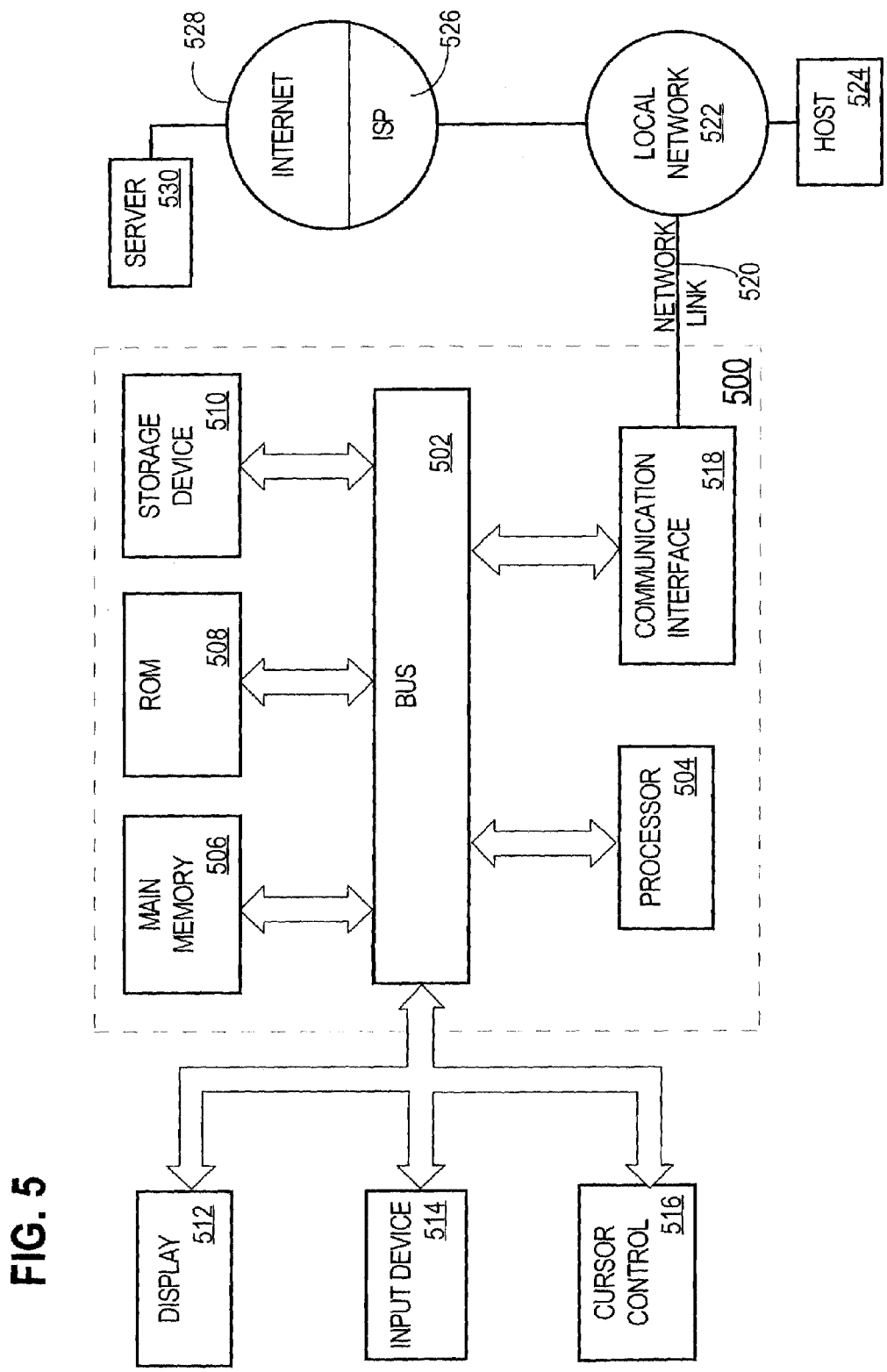
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, or magneto-optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical, magnetic, or magneto-optical disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, DVD, any other optical or magneto-optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments are described in the context of database queries; however, the techniques described are applicable to electronic searches for information, in general. For another example, embodiments are described in the context of text searches; however, the techniques are applicable to searches for types of information other than text. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing an information search, the method comprising the computer-implemented steps of:
   receiving a search request query that includes a sequence of sub-queries and specifies a progression in which to execute the sub-queries;
   based on the progression, executing a first sub-query from the sequence of sub-queries;
   executing one or more of the sub-queries other than the first sub-query in an order specified by the progression, wherein each of the one or more sub-queries other than the first sub-query is automatically executed only if results for previously executed one or more sub-queries are not sufficient to fulfill the search request; and
   providing results for one or more executed sub-queries from the sequence of sub-queries.

2. The method of claim 1, further comprising the computer-implemented steps of:
   receiving a request for a particular number of results for the search; and
   wherein each of the one or more sub-queries other than the first sub-query is executed only if previously executed sub-queries do not fulfill the request for the particular number of results.

3. The method of claim 1, wherein all the sub-queries select data from a database based on respective search criteria, and wherein the progression corresponds to a relaxation of original search criteria associated with the search.

4. The method of claim 1, wherein the progression is specified by an end user that is requesting the search.

5. The method of claim 3, wherein the progression is specified through interaction with a user interface.

6. The method of claim 1, wherein the step of executing one or more sub-queries includes the steps of:
   providing results for the first sub-query;
   receiving a request to provide more results;
   in response to receiving the request to provide more results and based on the progression, executing a second sub-query from the sequence of sub-queries; and
   providing results for the second sub-query.

7. The method of claim 1, wherein the step of receiving includes receiving as an XML document search criteria associated with the sequence of sub-queries and the progression.

8. The method of claim 1, wherein the step of receiving includes receiving the search request query from an application program that constructs the query based on a set of one or more rules, wherein the set is specified by an end user that is requesting the information.

9. The method of claim 8, wherein the application program is associated with a search engine.

10. The method of claim 1, wherein the step of receiving includes receiving a set of search criteria specified by an end user and receiving a request to construct a database query based on the search criteria; and wherein the method further comprises the computer-implemented step of:
   constructing a database query based on the search criteria.

11. The method of claim 1, wherein the step of receiving includes receiving the search request query that specifies search criteria in association with one or more sections of a document and receiving the progression that specifies an order in which to execute sub-queries associated with the search criteria against the one or more sections of the document.

12. A computer-readable storage medium carrying one or more sequences of instructions which, when executed by one or more processors, causes the one or more processors to perform the method recited in claim 1.

13. A computer-readable storage medium carrying one or more sequences of instructions which, when executed by one or more processors, causes the one or more processors to perform the method recited in claim 2.

14. A computer-readable storage medium carrying one or more sequences of instructions which, when executed by one or more processors, causes the one or more processors to perform the method recited in claim 3.

15. A computer-readable storage medium carrying one or more sequences of instructions which, when executed by one or more processors, causes the one or more processors to perform the method recited in claim 4.

16. A computer-readable storage medium carrying one or more sequences of instructions which, when executed by one or more processors, causes the one or more processors to perform the method recited in claim 5.

17. A computer-readable storage medium carrying one or more sequences of instructions which, when executed by one or more processors, causes the one or more processors to perform the method recited in claim 6.

18. A computer-readable storage medium carrying one or more sequences of instructions which, when executed by one or more processors, causes the one or more processors to perform the method recited in claim 7.

19. A computer-readable storage medium carrying one or more sequences of instructions which, when executed by one or more processors, causes the one or more processors to perform the method recited in claim 8.

20. A computer-readable storage medium carrying one or more sequences of instructions which, when executed by one or more processors, causes the one or more processors to perform the method recited in claim 9.

21. A computer-readable storage medium carrying one or more sequences of instructions which, when executed by one or more processors, causes the one or more processors to perform the method recited in claim 10.

22. A computer-readable storage medium carrying one or more sequences of instructions which, when executed by one or more processors, causes the one or more processors to perform the method recited in claim 11.

23. A method for managing a search for information, the method comprising the computer-implemented steps of:
specifying search criteria related to the information being searched for;
specifying an order in which to execute sub-queries associated with the search criteria; and
transmitting the search criteria and the order, for execution of one or more of the sub-queries by a database server in the order specified, wherein each of one or more sub-queries, other than a first sub-query in the order, is automatically executed only if results for previously executed one or more sub-queries are not sufficient to fulfill the search.

24. The method of claim 23, wherein the steps of specifying are performed by an end user that is requesting the search for information.

25. The method of claim 24, wherein the steps of specifying are performed through interaction with a user interface.

26. The method of claim 23, wherein the step of specifying search criteria includes specifying a single set of values, and wherein the step of specifying an order includes specifying an ordered set of one or more rules associated with the set of values.

27. The method of claim 26, wherein the ordered set of one or more rules includes a logical operator.

28. The method of claim 23, wherein the steps of specifying include specifying in the form of an XML document.

29. The method of claim 23, wherein the step of specifying search criteria includes specifying search criteria in association with one or more sections of a document, and wherein the step of specifying an order includes specifying an order in which to execute sub-queries associated with the search criteria against the one or more sections of the document.

30. The method of claim 29, wherein the step of specifying search criteria includes specifying search criteria in association with at least two particular sections of a document, and wherein the step of specifying an order includes specifying to execute sub-queries associated with the search criteria against the at least two particular sections of the document in a particular order.

31. A computer-readable storage medium carrying one or more sequences of instructions which, when executed by one or more processors, causes the one or more processors to perform the method recited in claim 23.

32. A computer-readable storage medium carrying one or more sequences of instructions which, when executed by one or more processors, causes the one or more processors to perform the method recited in claim 24.

33. A computer-readable storage medium carrying one or more sequences of instructions which, when executed by one or more processors, causes the one or more processors to perform the method recited in claim 25.

34. A computer-readable storage medium carrying one or more sequences of instructions which, when executed by one or more processors, causes the one or more processors to perform the method recited in claim 26.

35. A computer-readable storage medium carrying one or more sequences of instructions which, when executed by one or more processors, causes the one or more processors to perform the method recited in claim 27.

36. A computer-readable storage medium carrying one or more sequences of instructions which, when executed by one or more processors, causes the one or more processors to perform the method recited in claim 28.

37. A computer-readable storage medium carrying one or more sequences of instructions which, when executed by one or more processors, causes the one or more processors to perform the method recited in claim 29.

38. A computer-readable storage medium carrying one or more sequences of instructions which, when executed by one or more processors, causes the one or more processors to perform the method recited in claim 30.

39. A computer apparatus for managing an information search, the apparatus comprising:
means for receiving a search request query that includes a sequence of sub-queries and specifies a progression in which to execute the sub-queries;
means for executing, based on the progression, a first sub-query from the sequence of sub-queries; and
means for executing one or more of the sub-queries other than the first sub-query in an order specified by the progression, wherein each of the one or more sub-queries other than the first sub-query is automatically executed only if results for previously executed one or more sub-queries are not sufficient to fulfill the search request.

40. A computer apparatus for managing a search for information, the apparatus comprising:
means for specifying search criteria related to the information being searched for;
means for specifying an order in which to execute sub-queries associated with the search criteria; and
means for transmitting the search criteria and the order, for execution of one or more of the sub-queries by a database server in the order specified, wherein each of one or more sub-queries, other than a first sub-query in the order, is automatically executed only if results for previously executed one or more sub-queries are not sufficient to fulfill the search.

* * * * *